United States Patent
Oetiker

[15] 3,683,737
[45] Aug. 15, 1972

[54] DETACHABLE TWO-PARTITE CONNECTING ARRANGEMENT

[72] Inventor: Hans Oetiker, 21 Oberdorfstrasse, Horgen, Switzerland

[22] Filed: Oct. 30, 1969

[21] Appl. No.: 872,715

[52] U.S. Cl. .................................................. 85/8.8
[51] Int. Cl. .............................................. F16b 21/18
[58] Field of Search ............... 85/8.8, 5 N; 151/41.73; 287/DIG. 7; 24/211 K, 224 SS, 224 B, 224 BW

[56] References Cited

UNITED STATES PATENTS

| | | | |
|---|---|---|---|
| 1,056,392 | 3/1913 | Barr et al. | 85/8.8 |
| 2,353,933 | 7/1944 | Schneider | 85/8.8 |
| 2,534,105 | 12/1950 | Churchill | 85/8.8 |
| 3,221,794 | 12/1965 | Acres | 85/8.8 |
| 3,443,617 | 5/1969 | Whiteside et al. | 151/41.73 |
| 1,872,655 | 8/1932 | Blakeslee | 85/8.8 |
| 1,113,522 | 10/1914 | Waterman | 24/224 B |

FOREIGN PATENTS OR APPLICATIONS 1,504,805   10/1967   France ...................... 85/8.8

Primary Examiner—Edward C. Allen
Attorney—Craig, Antonelli & Hill

[57] ABSTRACT

A two-partite connection for structural parts of same thickness and provided with apertures adapted to be aligned, which includes a plug-type member provided with a groove in its shank portion at a location of about twice the thickness of a structural part; a locking member consisting of a base body with an elongated channel of a size corresponding to the reduced shank portion, left by the groove, enables displacement in the direction of the channel while a spaced tongue-like projection connected to the base body elastically engages the end face of the shank portion to produce a frictional force opposing assembly and disassembly.

11 Claims, 10 Drawing Figures

PATENTED AUG 15 1972 3,683,737

INVENTOR
HANS OETIKER

BY Craig, Antonelli, Stewart & Hill

ATTORNEYS

INVENTOR
HANS OETIKER

BY Craig, Antonelli, Stewart & Hill

ATTORNEYS

DETACHABLE TWO-PARTITE CONNECTING ARRANGEMENT

The present invention relates to a detachable connection for structural elements, and more particularly to a two-partite detachable connection for standard structural elements provided with identical apertures adapted to be aligned for the purpose of connection, as described in my co-pending application Ser. No. 872,554, entitled "Structural Assemblies," the subject matter of which is incorporated herein to the extent necessary.

Various types of detachable connections are used in the prior art for connecting together structural elements in the assembly, for example, of tent-like frames, emergency shelters, etc. The classic connection for this purpose is the use of a screw or bolt and nut. However, such type of connection is relatively time-consuming since both the screw or bolt and nut have to be held for tightening and release, not to mention the fact that such parts are relatively heavy in weight. Added thereto is the danger of inadvertent loosening in the course of time due to vibrations or the like.

Other types of fastening means known in the art are so-called lock nuts which, however, further increase the cost of manufacture and time required for installation.

Various types of clips or clamps are also known in the prior art to fasten together structural parts. However, these prior art devices are beset by the drawbacks of either inadequate holding and/or load carrying capacity when initially installed or under actual operation and/or of high cost of manufacture, not to mention the frequently existing difficulties in installing and removing such detachable connections, requiring oftentimes also special tools.

Another shortcoming of the prior art devices resides in the fact that the specific force required for installation is substantially the same as the specific force required for disassembly, thereby increasing the likelihood of inadvertent loosening.

Moreover, the prior art devices of two-partite construction frequently cause difficulties in assembly because both parts, for example, such as the bolt and the nut must be held in place in accurately aligned positions to permit the initial threading.

Accordingly, it is an object of the present invention to provide a two-partite connection for structural elements which is simple in construction, yet effectively avoids the aforementioned drawbacks encountered in the prior art.

Another object of the present invention resides in a two-partite connection for structural elements which is simple to install, easy to manufacture and requires no special skill or tools for assembly or disassembly.

A further object of the present invention resides in a two-partite connection for structural elements or the like in which the danger of inadvertent disconnection is greatly minimized.

Still another object of the present invention resides in a two-partite connection for structural elements or the like which can be readily assembled in a very short time and which permits the permanent anchoring of one of the two connector parts to one of the two structural parts to be connection by extremely simple means, thereby permitting pre-assembly.

These and further objects, features and advantages of the present invention will become more obvious from the following description when taken in connection with the accompanying drawing which shows, for purposes of illustration only, several embodiments in accordance with the present invention, and wherein.

Figure 1:
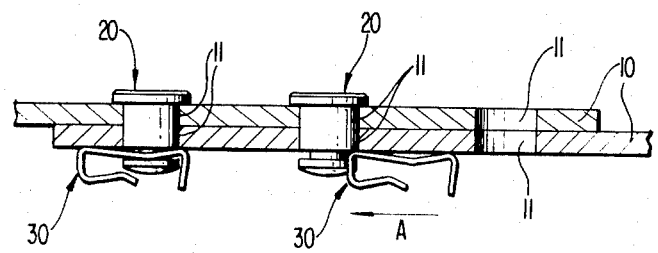
FIG. 1 is a cross-sectional view through two structural parts connected with each other by a two-partite connection in accordance with the present invention, the cross section being taken in the plane I—I of FIG. 6 with the parts in the assembled condition.

Referring now to the drawing wherein like reference numerals are used throughout the various views to designate like parts, and more particularly to FIG. 1, reference numeral 10 designates therein two structural members, such as steel plates, steel bars, profile members or angle members provided with identical apertures 11 accurately spaced so as to permit mutual alignment for purposes of interconnection.

The two-partite connecting arrangement of the present invention consists of a plug member generally designated by reference numeral 20 (FIGS. 1 and 2) and of a locking member generally designated by reference numeral 30 (FIGS. 1, 3, 4, and 5).

Figure 2:
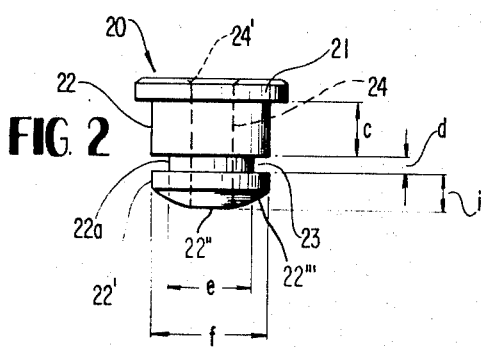
FIG. 2 is an elevational view of a plug-type connector member in accordance with the present invention.
Figure 3:
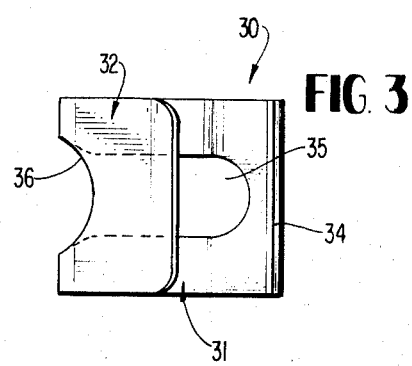
FIG. 3 is a top plan view of a locking member in accordance with the present invention.

The male-type connector member 20 includes a head portion 21 adjoined by a shank portion 22 provided with a circumferential groove 23. Additionally, the connector member 20 is provided with an axial bore 24, counter-sunk at 24' in the head portion 21. The dimension c, i.e., the axial length of the shank portion up to groove 23 is equal to or slightly less than twice the thickness of a structural member 10, each made of substantially the same thickness. The terminal section 22' of the shank portion 22 passes over into its exposed bottom surface 22" by way of an inclined annular surface 22''', constituting camming surfaces to be explained more fully hereinafter which may be formed, for example, by bevelled surfaces as shown in FIG. 2.

The locking member 30 consists of a major base portion generally designated by reference numeral 31, of a bent-back portion generally designated by reference numeral 32 connected with the base portion 31 by means of a web portion 33. At the end of the base portion 31 opposite the web portion 33, the locking member 30 is provided with an actuating portion 34 extending substantially at right angle to the base portion 31. The base portion 31 is provided with an elongated channel 35 terminating at the right end, as viewed in FIGS. 3, 4 and 5, in a semi-circularly shaped section 35' and being flared at the opposite end thereof by flared wall portions 35".

The bent-back portion 32 consists of a first section 32a extending in the direction toward the base portion 31 and of a short terminal portion 32b extending away from the base portion 31. Additionally, the bent-back part 32a is provided at its left end with an approximately circularly curved aperture or recess 36 as shown most clearly in FIG. 3. The recess 36 together with the flared wall portion 35" in effect form an aperture in the left end of the locking member as viewed in FIGS. 3–5 which is larger than the diameter $f$ (FIG. 2) of the shank portion (FIG. 2) whereby the flared wall portions 35" engaging in the groove 23 guide the connector member 20 into the channel 35 of the locking member 20. As can be seen from FIG. 4, the base portion 31 is constituted of a first section 31a sloping upwardly from the left to the right as viewed in FIG. 4 and of a second section 31b sloping downwardly from left to right. Additionally, the length $a$ of the section 31a is substantially greater than the length $b$ of the section 31b for reasons which will be explained more fully hereinafter.

Figure 6:
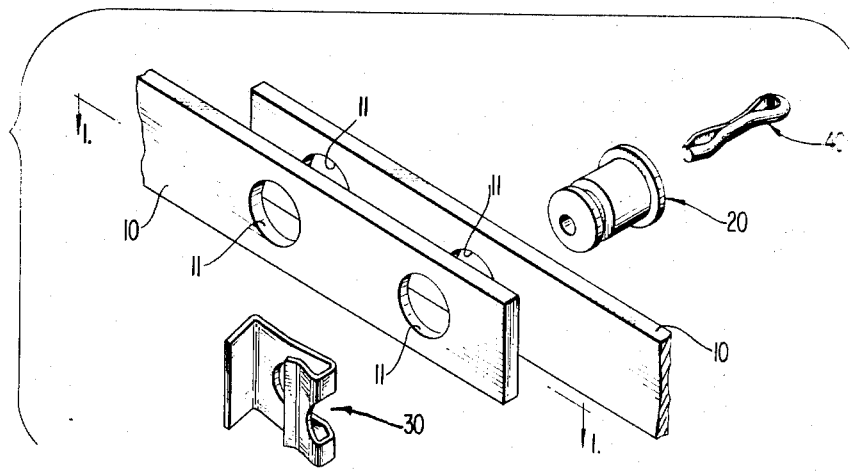
FIG. 6 is an exploded view, illustrating the assembly of two structural members by the two-partite connecting device of the present invention.

The distance $h$ (FIG. 4) from the lowest point of the bent-back portion 32 to the top of the surface section 31a is smaller than the distance $i$ (FIG. 2) from the bottom surface of groove 23 to the exposed bottom surface of the terminal section 22' of the shank portion of the connector member 20. Consequently, as the locking member 30 is installed by displacement in the direction of arrow A (see the right connecting assembly of FIG. 1), a friction force is produced opposing such movement by the engagement of the lowest surface area of the bent-back portion 32 with the end surface of the shank portion 22'. Just before the reduced shank portion 22a, left by groove 23, abuts against the terminal section 35' of the aperture 35, the bent-back portion 32 clears the shank portion 22 so that the bent-back part 32b now faces the camming surfaces 22'''. To disconnect the thus assembled parts, it is only necessary to displace the locking member 30 in a direction opposite to the arrow A (FIG. 1) by any suitable means, for example, by the use of a string or flexible wire engaging against the inner surface of actuating portion 34 and applying a pulling force in the direction opposite arrow A. Since the bent-back portion 32b faces the camming surface 22''', i.e., the free end of the bent-back portion 32b is not disposed below the camming surface 22''', the bent-back portion 32b will be automatically cammed up when being displaced by the application of a disengaging force at the actuating portion 34. Such displacement will be opposed frictionally as soon as the lowest area of the bent-back portion 32 re-engages with the exposed end face of the shank portion 22'. Since the slope of the surface portion 32b is greater due to its shorter length, the specific force which must be applied to overcome the opposing frictional force is greater during disassembly of the locking member than is necessary during assembly, thereby constituting a further safety feature against inadvertent disengagement. Furthermore, any conventional securing means, for example, a cotter pin 40 (FIG. 6) or the like may be extended through the bore 24 of the male connector member 22, once the locking member 30 snaps into the engaged position, which would form-lockingly preclude inadvertent disengagement.

Figure 4:
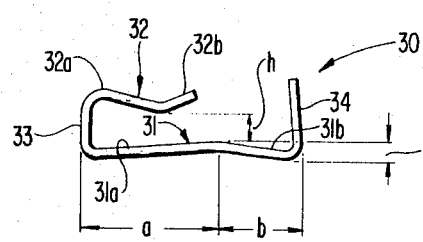
FIG. 4 is a front elevational view of the locking member of FIG. 3.
Figure 5:
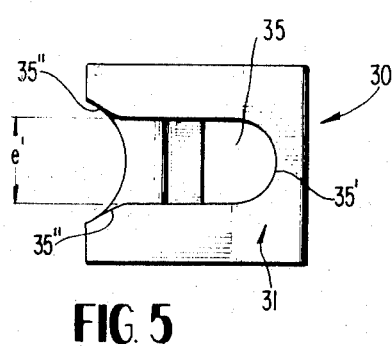
FIG. 5 is a bottom plan view of the locking member of FIGS. 3 and 4.
Figure 10:
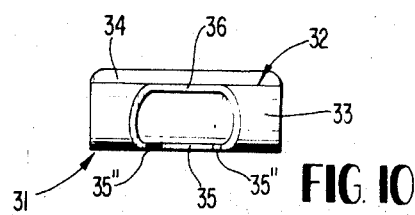
FIG. 10 is a left side view of the locking member of FIG. 3.

Obviously, the diametric dimension $e$ (FIG. 2) of the reduced shank portion of the connector member 20 is slightly smaller than the width $e'$ (FIG. 5) of the aperture 35. Furthermore, the dimension $d$ (FIG. 2) of the groove 23 in the axial dimension should be approximately equal to the dimension $d'$ of the locking member as shown in FIG. 4.

Figure 7:
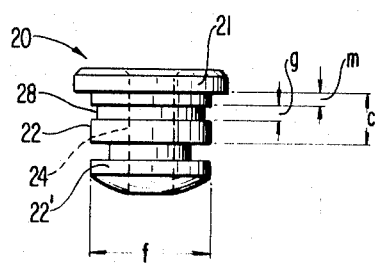
FIG. 7 is an elevational view of a modified embodiment of a plug-type connector member in accordance with the present invention.
Figure 8:
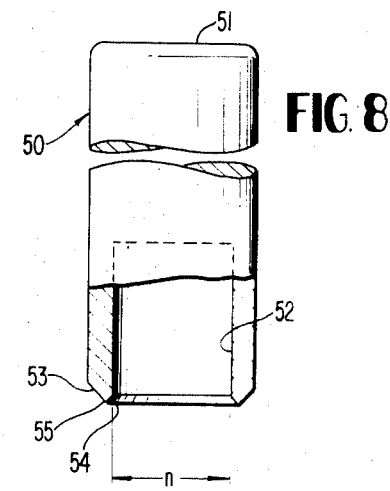
FIG. 8 is a flaring tool for use with the present invention.

At times, it may be desirable to preassemble the plug-type connector members 20 to one of the two structural parts to facilitate assembly. For this purpose, the plug-type connector member of FIG. 7 may be used, which is identical to that of FIG. 2 (and therefore designated by the same reference numerals), the only difference between the embodiment of FIG. 2 and that of FIG. 7 being the provision of an additional annular groove 28 having a relatively shallow depth, of the order of about ½ to 1 mm., though this depth, as measured in the diametric dimension of the shank portion, may be varied somewhat according to the size of the shank portion as used.

Figure 9:
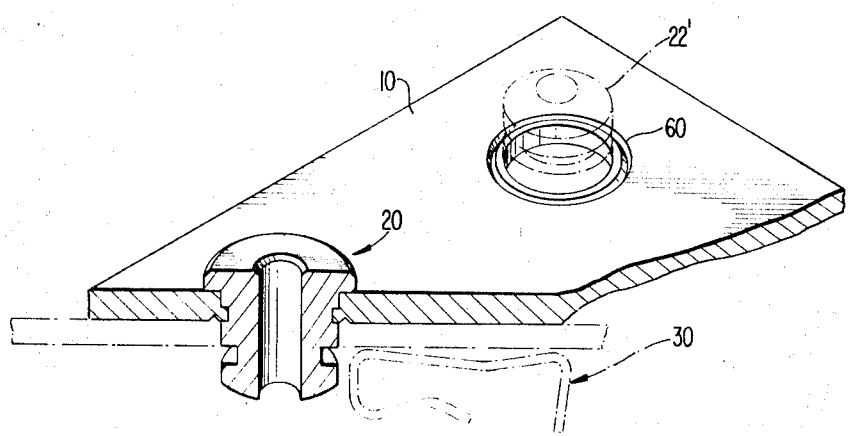
FIG. 9 is a partial perspective, partly broken away view illustrating the effect of the flaring tool of FIG. 8.

To anchor the connector member 20 in one of the structural elements, the shank portion 22 thereof is inserted into the respective aperture 11 thereof, the head portion 21 is supported against a firm support and the flaring tool 50 having an internal bore 52 of a diametric dimension $n$ slightly larger than the diametric dimension $f$ of the shank portion is placed over the projecting end portion 22' of a connector member 20 indicated in phantome line in FIG. 9 whereupon sharp blows are applied against the surface 51 of the tool 50 so that the tool edge 55 formed by the chamfered or beveled surfaces 53 and 54 presses against the exposed surface of the structural member and displaces material below the surface from the structural part 10 into the groove 28. Surprisingly, the indentation made by the edge 55 in the surface of the material of the structural element 10, represented by the ring 60 (not shown to scale in FIG. 9) is relatively shallow. As a result of the displacement of the material into the groove 28, the connector member is then anchored to the corresponding structural element.

The connector member 20 may be, depending on the force applied against the surface 51 of the tool 50, anchored either completely immovably or so as to be able to rotate and align itself during assembly by slightly pivoting in its anchored condition.

The location of the groove 28 should be such as to occur within the central region of the structural part as viewed in cross section, i.e., the dimension $m$ should be between about one-fourth and one-half the thickness of a structural part while the dimension $g$ in the axial direction of the groove 28 is of the order of 1 mm. Again, this dimension may also be varied to suit the particular needs of a given application. FIG. 9 illustrates a connector member 20 anchored to the structural part 10 by the method outlined above.

While I have shown and described only two embodiments in accordance with the present invention, it is understood that the same is not limited thereto but is susceptible of numerous changes and modifications as known to those skilled in the art. For example, the dimensions may be varied according to the size of structural parts and apertures and the materials and thickness of the locking member may also be varied at will to achieve any desired frictional force opposing assembly and disassembly.

Thus, it is obvious that the present invention is not limited to the details shown and described herein but is susceptible of numerous changes and modifications, and I therefore do not wish to be limited to the details shown and described herein but intend to cover all such changes and modifications as are within the scope of those skilled in the art.

I claim:

1. A two-partite connecting arrangement for structural parts provided with similar apertures adapted to be aligned, characterized by a plug-type connector means having a head portion and a shank portion of diametric dimension complementary to the apertures and of an axial length greater than twice the thickness of a structural part, a groove being provided in said shank portion at a location corresponding approximately to twice the thickness of a structural part thereby forming in effect a reduced shank portion, and said shank portion passing over into its exposed bottom surface of smaller diameter than the diameter of the shank portion by way of annular inclined camming surface means, and locking means including base body means, which is provided with an open ended aperture means of a width complementary to the reduced shank portion, and frictional force-producing means on said locking means in the form of a bent-back part connected to but spaced from the opposite surface of said base body means, said bent-back part being connected with said surface means by a web portion provided with opening means enabling insertion therethrough of said end portion underneath said bent-back part, said bent-back portion including a first section adjoining said web portion and extending toward said base body means and a second section adjoining said first section and extending away from said base body means, said first and second sections subtending an obtuse angle with the apex thereof approaching the base body means, the distance from the lowest point of the bent-back part formed by said apex to said base body means being less than the distance from the groove surface of the shank portion closest to its exposed bottom surface, said first and second sections having a length which is greater than length of said aperture means less the diameter of said shank portion and the angle of said second section being generally of the same order of magnitude as the angle of said camming surface means and of such length that at least a part of said second section always overlaps and faces said camming surface means when the groove on said shank portion engages the inner end of said aperture means to provide an automatic camming up as the apex rides up on said camming surface means during disconnection.

2. A connecting arrangement according to claim 1, characterized by anchoring means including groove means in said connector means to enable anchoring thereof to a structural part by displacement of metal from a structural part into the groove means.

3. A connecting arrangement according to claim 1, characterized by oppositely inclined surface portions of said first and second sections which are of unequal length, the greater length being on the side of the web portion.

4. A connecting arrangement according to claim 3, characterized by actuating means in the form of a portion extending at approximately right angle to the base body means.

5. A connecting arrangement according to claim 4, characterized in that said connector means is provided with a further groove between said first groove and said head portion at such place as to be located within the central region of the structural element abutting against the head portion as viewed in the cross-sectional direction of such structural element, said further groove serving to anchor the connector means to the structural part.

6. A connecting arrangement according to claim 4, characterized by anchoring means including groove means in said connector means to enable anchoring thereof to a structural part by displacement of metal from a structural part into the groove means.

7. A connecting arrangement according to claim 1, characterized by actuating means in the form of a portion extending at approximately right angle to the base body means for actuating said locking means in the assembling direction.

8. A connecting arrangement according to claim 1, characterized in that said connector means is provided with a further groove between said first groove said said head portion at such place as to be located within the central region of the structural element abutting against the head portion as viewed in the cross-sectional direction of such structural element, said further groove serving to anchor the connector means to the structural part.

9. A connecting arrangement according to claim 1, characterized in that the free end of said second section is substantially straight.

10. A connecting arrangement according to claim 9, characterized in that the distance from the free end of said second section to said base body means is at least equal to the distance from the free end of said shank portion to said groove.

11. A connecting arrangement according to claim 10, characterized in that said web portion extends nearly right angle to said base body means and said first section over the major portion of the length.

* * * * *